United States Patent Office 2,693,452
Patented Nov. 2, 1954

2,693,452

PREPARATION OF CATION EXCHANGE MATERIAL FROM COAL

Martinus L. Goedkoop, Geleen, Netherlands, assignor to De Directie van de Staatsmijnen in Limburg, Handelend voor en namens de Staat der Nederlanden, Heerlen, Netherlands No Drawing. Application August 4, 1950, Serial No. 177,764

Claims priority, application Netherlands August 20, 1949

7 Claims. (Cl. 252—179)

The invention relates to the preparation of cation exchange material from coal.

FIELD OF INVENTION

In the preparation of cation exchange material from solid carbonaceous materials such as coal, anthracite, lignite, peat, wood, coke, semi-coke and such like, these materials are treated with dehydrating agents, particularly concentrated sulphuric acid. The preparation by means of concentrated sulphuric acid, however, has the disadvantage that products of a small and slightly variable grain size are obtained, because during the treatment the grains are disintegrated. Moreover, a large amount of sulphur dioxide is formed during the reaction with sulphuric acid, so that special precautions must be taken, and furthermore the sulphuric acid also reacts with the ash components of the starting materials so that allowance must be made for losses of sulphuric acid.

According to the invention the above mentioned disadvantages may be obviated by preparing the cation exchange material in another way without using sulphuric acid or similar substances.

OBJECTS

A principal object of this invention is the provision of a new process, and new steps in the process, for the preparation of cation exchange material from solid carbonaceous materials.

Further objects include:
1. The provision of such procedures for the preparation of cation exchange material, which can be accomplished without the use of sulphuric acid or such-like substances.
2. The provision of a new and unique method of preparing cation exchange material without a substantial decrease of the grain size of the material during the preparation.
3. The provision of such procedures by which cation exchange material is obtained from products having a low acetate number, as hereinafter defined.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

GENERAL DESCRIPTION

These objects are accomplished according to the present invention by heating the initial solid carbonaceous material in oxygen or an oxygen-containing gas at a temperature within the range from 80° to 450° C. and by hydrolyzing the reaction product thus obtained in an alkaline medium for producing the desired cation exchange material.

The oxygen-containing gas may conveniently be air but other oxygen-containing gases may be used though the carrying out of the process may be more complicated.

By heating the starting material in oxygen or an oxygen-containing gas, the material is partially oxidized, during which oxidation products are formed which, after being hydrolyzed in an alkaline medium, may be used as cation exchange material.

DETAILED DESCRIPTION

The temperature to which the starting material is heated may be varied between 80 and 450° C., and when using a medium, rich in oxygen, the said temperature may be lower than in those cases where a gas with a low oxygen content is used.

If temperatures above 450° C., are used combustion occurs so that lower yields and lower-grade products are obtained. At temperatures below 80° C. the oxidation is too slow. The length of the heating period required depends on the temperature at which heating takes place and on the character of the starting material and must be determined experimentally.

In addition also the character of the products of the partial oxidation and hence the properties of the cation exchange material to be prepared, are influenced by the temperature.

I have found that at temperatures between 220 and 350° C. products are obtained which during the hydrolyzing treatment with alkali hydroxide yield only a small amount of soluble components and which possess excellent properties as cation exchange material.

The reaction product of the heating is characterized by a low acetate number (the acetate number is the number of milligram equivalents acetic acid set free from a 1 N calcium acetate solution by 1 gram of the product under certain reaction conditions for which we refer to W. Fuchs, Fuel in Science and Practice, vol. 22, 116 (1943)). In most cases the acetate number of the reaction product is lower than 0.5.

The heating of the starting material may be carried out in appropriate apparatus, for example in rotary drums wherein the material is kept in motion during heating. Very good results are obtained if the heating is carried out by passing oxygen or an oxygen-containing gas through the material while the latter is maintained in a fluidized state. In this case the medium need not be preheated separately because of the exothermic character of the oxidation occurring during the heating. If the process according to the invention is carried out in this manner the establishment and maintenance of a fluidized state of the solid particles may be effected in accordance with established practice in operations involving a fluidized system, such operations enabling continuous operation to be carried out easily.

After heating has been terminated the reaction product is subjected to a hydrolysis during which mainly insoluble salts are obtained from the oxidation products of a high molecular weight which have been formed during heating. The small amounts of products of a low molecular weight which have been formed likewise are eliminated from the reaction product because they are dissolved. In most cases only a small percentage of the reaction products was found to dissolve during the hydrolysis.

The alkaline medium required for the hydrolysis may be obtained with the alkali hydroxides or with the salts of weak acids, such as carbonates of the alkali metals which salts produce an alkaline reaction. The hydroxides of the alkaline earth metals may also be used. The hydrolysis can be accelerated by hydrolyzing at the boiling temperature or thereabout.

I have found that concentrated solutions are not required but that with alkali hydroxide solutions of 2% to 5% favourable results are obtained.

After the treatment with alkali hydroxide, the suspended product is separated from the solution which may be effected by decantation and rinsing with water or dilute acids.

Compared with the processes known hitherto, the process according to the invention has the advantage that the grain size of the starting material is practically maintained, because the grains do not disintegrate during the various operations. This advantage is of importance because it is now possible to prepare cation exchange material of a certain grain size by selecting a starting material of the grain size desired.

The products obtained with the process according to the invention may be used as cation exchange material, for example in the softening of water. Not only may these products be used as alkali ion exchange material for the fixation of ions of calcium, magnesium, cadmium and other metals, but they may also be applied as a hydrogen ion exchange material, particularly in the fixation of ions of the alkali metals or of ammonium ions, provided they have been subjected to a preliminary treatment with dilute acids such as hydrochloric acid or sulphuric acid.

The regenerations of the cation exchange material according to the invention may be carried out in the usual manner for instance by means of a treatment with a sodium chloride solution. If the product is to be applied as a hydrogen ion exchange material, the regeneration is carried out with a dilute acid.

Example 1

500 g. anthractite having a grain size ranging between 0.2 and 0.5 mm. were heated in a fluidized state for 24 hours at a temperature of 325° C. in a medium of air which was passed through at a rate of 25 litres per minute.

The reaction product (acetate number 0.45) was suspended in 3 litres of a sodium hydroxide solution (1 N) and the suspension boiled for 30 minutes. After the solution had been decanted the reaction product was rinsed with distilled water. In this manner 503 g. final product were obtained of practically the same grain size as the starting material.

In order to test its properties as a cation exchange material, 1 gram of the product was used as a filter bed, through which a 1% cadmium acetate solution was passed, whereafter 80 mg. cadmium proved to have been fixed.

Subsequent to the regeneration with a sodium chloride solution, a calcium chloride solution (1 N) was passed through the filter bed, whereafter 54 mg. calcium was found to have been fixed.

After a repeated regeneration with sodium chloride, 400 ml. tap water (degree of hardness: 16.4 mg. calcium oxide per 100 ml.) were passed dropwise through the filter. Only after 300 ml. had been passed through, a slight amount of calcium could be detected in the filtrate and the degree of hardness of the entire filtrate proved to have dropped to 1.4.

Example 2

In the manner outlined in Example 1, 500 g. of semibituminous coal having a grain size ranging between 0.3 and 1 mm., were heated in air at 300° C. for 72 hours. Every minute 30 litres of air were passed through.

After the treatment with sodium hydroxide 485 g. cation exchange material were obtained of the same grain size as the starting material.

Example 3

500 g. semianthracite (grain size 0.2–0.5 mm.) were treated in a manner similar to that outlined in Example 1. The coal was kept in a fluidized state and heated in air at 225° C. for 60 hours (amount of air 60 litres per min.). In this case the hydrolysis was carried out with 4 litres of a sodium hydroxide solution (½ N) at a temperature of 97° C. and took 45 minutes. After rinsing the reaction product with tap water, it was subjected to a final treatment with hydrochloric acid (concentration 2 normal). In this manner 515 g. hydrogen ion exchange material were obtained of the same grain size as the starting material.

Example 4

In the same manner as outlined in Example 1, 500 g. semianthracite (grain size 0.2–0.5 mm.) were heated in an oxygen atmosphere at 225° C. for 12 hours, during which 60 litres of oxygen/minute were passed through.

Subsequently the reaction product was hydrolyzed for 30 minutes with 3 litres of a potassium hydroxide solution (1 N), at the boiling temperature of the solution.

After a treatment with distilled water 520 g. cation exchange material were obtained of the same grain size as the starting material.

SUMMARY

The present invention, as described above, provides a new process in the art of cation exchange material manufacture.

Operating as described, it has been found, that cation exchange material of high quality can be prepared in a rather simple way. These results are obtained without the use of sulfuric acid or such like substances, so that the difficulties as usually encountered by using sulphuric acid, are entirely avoided.

I claim:

1. A process for the manufacture of cation exchange material which comprises heating, in a medium of a free oxygen-containing gas and at a temperature within the range of from 220 to 350° C. coal which is oxidizable but not completely decomposable under the conditions employed and which is of about 0.2 to 1 mm. particle size, continuing said heating until said material is oxidized, subsequently hydrolyzing the oxidized product by treatment thereof with a hot aqueous strongly alkaline solution and thereafter separating the hydrolyzed product from said solution, the time of heating the initial coal being such that the particle size of the cation exchanger is substantially the same grain size as that of the starting material.

2. The process of claim 1, wherein said coal is semi-bituminous coal.

3. The process of claim 1, wherein said coal is semi-anthracite coal.

4. The process set forth in claim 1, wherein the hydrolysis is carried out with a 2–5% aqueous solution of an alkali metal hydroxide.

5. The process of claim 1 wherein said aqueous alkaline solution is maintained at about its boiling point.

6. The process of claim 1 wherein said starting material is maintained in a fluidized state by means of said oxygen-containing gas.

7. The process of claim 1 wherein said coal is anthracite coal and said free oxygen-containing gas is air.

References Cited in the file of this patent

UNITED STATES PATENTS

| Number | Name | Date |
|---|---|---|
| 2,309,363 | Urbain et al. | Jan. 26, 1943 |

FOREIGN PATENTS

| Number | Country | Date |
|---|---|---|
| 547,580 | Great Britain | Sept. 2, 1942 |